(12) United States Patent
Sutic et al.

(10) Patent No.: US 10,796,200 B2
(45) Date of Patent: Oct. 6, 2020

(54) TRAINING IMAGE SIGNAL PROCESSORS USING INTERMEDIATE LOSS FUNCTIONS

(71) Applicant: Intel Corporation, Santa Clara, CA (US)

(72) Inventors: Aleksandar Sutic, Santa Clara, CA (US); Zoran Zivkovic, Hertogenbosch (NL); Gilad Michael, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 195 days.

(21) Appl. No.: 15/965,158

(22) Filed: Apr. 27, 2018

(65) Prior Publication Data
US 2019/0050682 A1 Feb. 14, 2019

(51) Int. Cl.
| | |
|---|---|
| *G06T 9/00* | (2006.01) |
| *G06K 9/62* | (2006.01) |
| *G06N 5/04* | (2006.01) |
| *G06T 1/00* | (2006.01) |
| *G06K 9/66* | (2006.01) |
| *G06T 5/00* | (2006.01) |
| *G06N 3/04* | (2006.01) |

(52) U.S. Cl.
CPC ......... *G06K 9/6256* (2013.01); *G06K 9/6274* (2013.01); *G06K 9/6292* (2013.01); *G06K 9/66* (2013.01); *G06N 3/0454* (2013.01); *G06N 5/046* (2013.01); *G06T 1/0014* (2013.01); *G06T 5/00* (2013.01); *G06T 2207/20081* (2013.01)

(58) Field of Classification Search
CPC .. G06K 9/6256; G06K 9/6274; G06K 9/6299; G06K 9/66; G06N 3/0454; G06N 5/046; G06T 1/0014; G06T 5/00; G06T 2207/20081
See application file for complete search history.

(56) References Cited

U.S. PATENT DOCUMENTS

| | | | |
|---|---|---|---|
| 6,229,569 B1 * | 5/2001 | Saito | H04N 5/2252 348/270 |
| 6,262,645 B1 | 7/2001 | McNeil et al. | |
| 10,140,544 B1 * | 11/2018 | Zhao | G06K 9/3233 |
| 10,410,096 B2 * | 9/2019 | Dijkman | G06K 9/4628 |
| 10,410,322 B2 * | 9/2019 | Viswanathan | G06T 3/4046 |
| 10,438,350 B2 * | 10/2019 | Patil | G06N 3/084 |
| 10,565,758 B2 * | 2/2020 | Hadap | G06N 3/0454 |
| 2019/0050682 A1 * | 2/2019 | Sutic | G06T 1/0014 |

(Continued)

OTHER PUBLICATIONS

Chen et al., "Fast Image Processing with Fully-Convolutional Networks", Computer Vision Foundation, ICCV 2017, USA, 10 pages.

(Continued)

*Primary Examiner* — Gregory M Desire
(74) *Attorney, Agent, or Firm* — Hanley, Flight & Zimmerman, LLC

(57) ABSTRACT

In an example method for training image signal processors, a reconstructed image is generated via an image signal processor based on a sensor image. An intermediate loss function is generated based on a comparison of an output of one or more corresponding layers of a computer vision network and a copy of the computer vision network. The output of the computer vision network is based on the reconstructed image. An image signal processor is trained based on the intermediate loss function.

25 Claims, 7 Drawing Sheets

(56) References Cited

U.S. PATENT DOCUMENTS

2019/0130217 A1* 5/2019 Wu ........................ G06K 9/54
2019/0304069 A1* 10/2019 Vogels ................ G06N 3/0454

OTHER PUBLICATIONS

Common Objects in Context website, Common Objects in Context dataset, reviewed on May 18, 2018: http://cocodataset.org/#home et al., USA, 2 pages.

Diamond et al., "Dirty Pixels: Optimizing Image Classification Architectures for Raw Sensor Data", reviewed on May 18, 2018: https://arxiv.org/pdf/1701.06487.pdf, Cornell University Library website, USA, 11 pages.

Howard et al., "MobileNets: Efficient Convolutional Neural Networks for Mobile Vision Applications", CVPR 2017, USA, 9 pages.

* cited by examiner

TRAINING IMAGE SIGNAL PROCESSORS USING INTERMEDIATE LOSS FUNCTIONS

BACKGROUND

Image signal processors (ISPs) may include hardware and software with a number of parameters that control the processing of images. For example, an ISP may be designed, and the parameters of the ISP tuned, based on objective or subjective image quality metrics. Captured images may be processed by the ISP for computer vision tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, ISPs may be used to process captured images for various vision tasks. For example, the computer vision tasks may include high-level vision tasks such as object detection, object recognition, semantic segmentation, and image caption generation, among others. However, the ISPs may have parameters tuned based on metrics for human vision. Therefore, ISPs may operate less accurately when used in computer vision tasks.

Computer vision applications may be based on deep learning techniques. Training a deep learning system may include using gradients of a loss function with respect to one or more parameters. However, some ISP parameters may not be able to be linked by analytical gradients to a loss function. For example, non-gradient methods may be used or the gradients may be numerically approximated. Determining a set of parameters to use in such cases may be time consuming. Moreover, in cases where ISP parameters may be linked by gradients to a loss function, regular deep learning techniques can be used to train the ISP for specific high-level vision tasks. However, very deep networks may be difficult and slow to train and may often fail to converge. In addition, prepending an ISP network to an already large deep learning network may result in a slower training process.

The present disclosure relates generally to techniques for training ISPs. Specifically, the techniques described herein include an apparatus, method and system for training ISPs using intermediate loss functions. An example apparatus includes an image signal processor to be trained, the image signal processor to generate a reconstructed image based on a sensor image. The apparatus includes an intermediate loss function generator to generate an intermediate loss function based on a comparison of output of one or more corresponding layers of a computer vision network and a copy of the computer vision network. In some examples, the apparatus may also include a total loss function generator to generate a total loss function based on the intermediate loss function. For example, the total loss function may be generated based on the intermediate loss function and another loss function generated based on ground truths and the output of the computer vision network. The apparatus further includes a parameter modifier to modify one or more parameters of the image signal processor based on the intermediate loss function or the total loss function.

The techniques described herein thus enable improved training of image signal processors. For example, the speed of convergence during training may be increased using the techniques described herein. In addition, the techniques described herein may allow training of ISP parameters that may not be able to be linked by analytical gradients to a loss function. Moreover, techniques described herein also allow using image data other than the original training data to adjust the ISP parameters.

Figure 1:
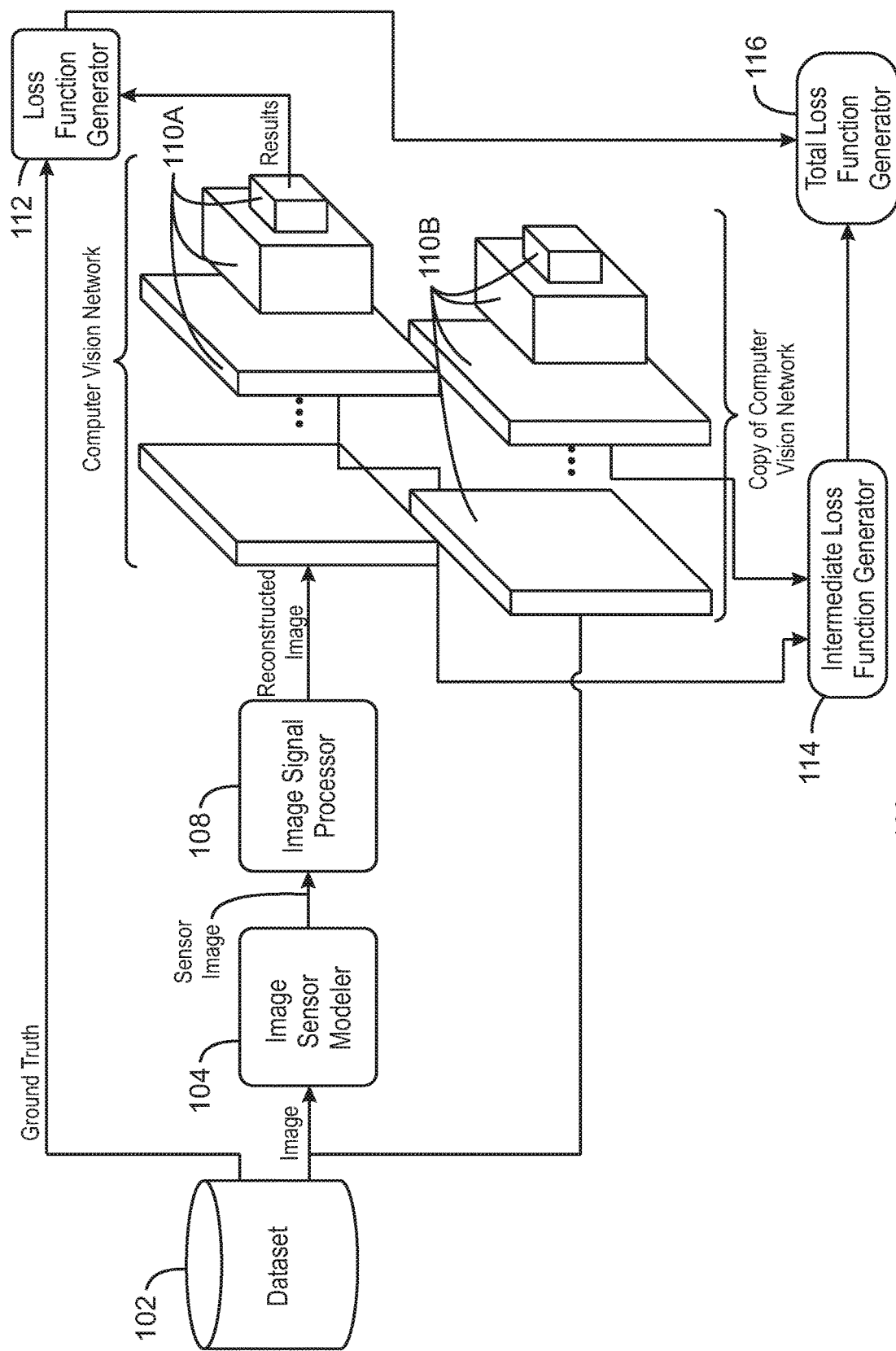
FIG. 1 is a schematic diagram illustrating an example system for training an image signal processor (ISP) using a total loss function based in part on an intermediate loss function.

FIG. 1 is a block diagram illustrating an example system for training an image signal processor (ISP) using a total loss function based in part on an intermediate loss function. The example system is referred to generally by the reference number 100 and can be implemented in the computing device 400 below in FIG. 4 using the method 500 of FIG. 5 below.

The example system 100 includes a data set 102. The data set 102 may include images to be used for training. For example, the images may include one or more objects to be detected for a computer vision task. The data set 102 may also include ground truth data associated with each of the images to be used to calculate one or more loss functions. For example, the ground truth data may include labels, bounding boxes, segmentation masks, pixel-dense distance from the camera for depth map estimation, body joint positions, etc. The system 100 includes an image sensor modeler 104 communicatively coupled to the dataset 102 to receive images. The image sensor modeler 104 may process the images received from the dataset 102 to simulate sensor images from the image sensors. For example, the image sensor modeler 104 may include a color filter array (CFA) to simulate a CFA of an image sensor, a noise generator to simulate noise of a imaging sensor, a point spread function (PSF) to simulate the response of an optical system of an imaging sensor. The system 100 includes an image signal processor (ISP) 108 communicatively coupled to the image sensor modeler 104. In some examples, the ISP 108 may be a software model of an ISP or a hardware ISP. The ISP 108 may be trained to reconstruct images from the dataset 102 using the sensor images from the image sensor modeler 104. The parameters of the ISP 108 may be trained to generate images suitable for computer vision tasks using the techniques described herein. The system 100 also includes a computer vision network 110A communicatively coupled to the image signal processor 108. For example, the computer vision network 110A may be a deep learning network, such as a neural network including various layers. The computer vision network 110A may output results to a loss function generator 112 that is communicatively coupled to the computer vision network 110A. The loss function generator 112 is also communicatively coupled to the data 102 and may receive ground truth data from the dataset 102. The system 100 also further includes a copy of the computer vision network 110B that is communicatively coupled to the dataset 102. The copy of the computer vision network 110B may receive images directly from the dataset 102. An intermediate loss function generator 114 may be communicatively coupled to both the computer vision network 110A and the copy of the computer vision network 110B. The intermediate loss function generator 114 may generate an intermediate loss function based on a comparison of results of the layers of the computer vision network 110A with results of corresponding layers of the copy of the computer vision network 110B. For example, the intermediate loss may be computed by running an inference on the ground truth and produced image. The ground truth may be the labels associated with the image. Feature maps may be extracted and compared based on a predetermined fitness metric. The system 110 also further includes a total loss function generator 116 coupled to both the loss function generator 112 and the intermediate loss function generator 114. The total loss function generator 116 may receive a loss function from the loss function generator 112 and an intermediate loss function from the intermediate loss function generator 114 and generate a total loss function based on the received loss function and intermediate loss function. For example, the total loss function may be used to initialize the ISP with a set of parameters more suitable for computer vision tasks. As used herein, a parameter may be a setting of an image signal processor that can be increased, decreased, or otherwise manipulated to change an output of the ISP.

As shown in FIG. 1, the computer vision network 110A may generate a regular computer vision task loss function based on a comparison of the computer vision network 110A output and ground truth data from the dataset 102. For example, the vision task loss function may be a classification error. In addition, the computer vision network 110A may be replicated to generate copy of the computer vision network 110B that is fed by the original images from the dataset 102. For example, the computer vision networks 110A and 110B may be both be associated with a particular computer vision task. The intermediate loss function generator 114 may generate an intermediate loss function to compare the values of some intermediate values. For example, the intermediate values may be one or more layer outputs in a deep learning solution represented by computer vision networks 110A and 110B. The total loss function generator 116 can combine the intermediate loss function with the regular computer vision task loss function to form a final total loss function for training. In some examples, the combination used to generate the total loss function can be, for example, a weighted sum, as shown by the equation:

$$\text{Loss}_{total} = w_{cv}\text{Loss}_{cv} + w_{intermediate}\text{Loss}_{intermediate} \qquad \text{Eq. 1}$$

where $\text{Loss}_{cv}$ is the regular computer vision loss generated by the loss function generator 112, $\text{Loss}_{intermediate}$ is the intermediate loss generated by the intermediate loss function generator 114, and the weighting factors $w_{cv}$, $w_{intermediate}$ indicate how the losses are combined and may be chosen empirically for particular application. In some examples, the values of the regular computer vision loss and the intermediate loss may be normalized. For example, the weighting factors may be used to normalize the values of the regular computer vision loss and the intermediate loss. The intermediate loss may be a comparison between one or more intermediate results of the computer vision networks 110A and 110B. For example, the intermediate loss may be calculated using mean squared different between the values of an output of a particular layer in a deep learning network. In some examples, the inputs to the computer vision networks 110A and 110B may also be compared. For example, reconstructed image may be compared with the original image from the dataset. In some examples, any combination of intermediate results in the computer vision networks 110A and 110B may be compared. Any suitable similarly measurements may be used. For example, the intermediate loss function may be a weighted sum of mean squared errors of any number of intermediate results. In some examples, a mean absolute difference, a mean square difference, a structural similarity index metric, or a learned similarity metric may be used as well. For example, another network that learns the parameters of the similarity metric may be used alternatively or in addition. In some examples, automatic ISP parameter tuning may start with a strong influence of the intermediate loss. For example, $w_{cv}$=0.01, $w_{intermediate}$=0.99 and after a number of iterations of the training procedure the value of weighting factor $w_{cv}$ may be increased and the value of weighting factor $w_{intermediate}$ may be reduced until, in a last iteration, the weighting factors are set at $w_{cv}$=1, $w_{intermediate}$=0. In some examples, the weighting factors may be adjusted based on a preset number of training iterations. For example, the weighting factors may be adjusted every 500 iterations of training.

The diagram of FIG. 1 is not intended to indicate that the example system 100 is to include all of the components shown in FIG. 1. Rather, the example system 100 can be implemented using fewer or additional components not illustrated in FIG. 1 (e.g., additional datasets, ISPs, vision networks, loss function generators, loss functions, etc.).

Figure 2:
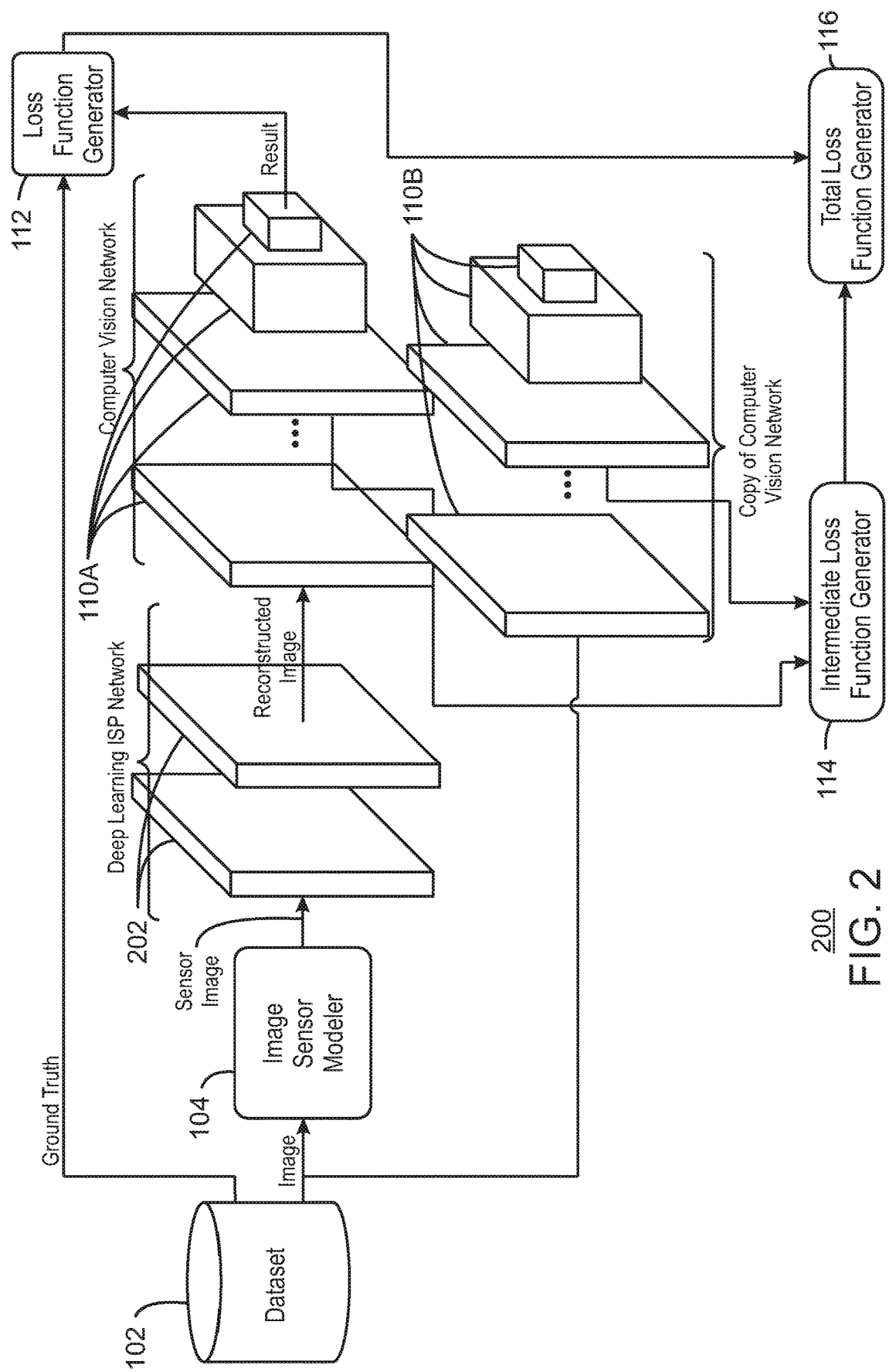
FIG. 2 is a schematic diagram illustrating an example system for training a deep learning ISP using a total loss function based in part on an intermediate loss function.

FIG. 2 is a block diagram illustrating an example system for training a deep learning ISP using a total loss function based in part on an intermediate loss function. The example system is referred to generally by the reference number 200 and can be implemented in the computing device 600 below in FIG. 6 using the method 500 of FIG. 5 below.

The example system 200 includes similarly numbered elements described in FIG. 1 above. In addition, the system 200 includes a deep learning ISP network 202 communicatively coupled to the image sensor modeler 104 and the computer vision network 110A.

As shown in FIG. 2, the ISP used may be a deep learning network. For example, the deep learning network may be based on a set of fully convolutional layers. The ISP network 202 may have a predetermined number of layers. For example, the number of layers may be based on a complexity of the processing and computations to be modeled with a CNN. A convolutional neural network (CNN) may be used for the computer vision network 810A and 810B. For example, a MobileNet CNN may be used. As used herein, a MobileNet is a small, low-latency, low-power models parameterized to meet the resource constraints of a variety of use cases. MobileNets may be built upon for classification, detection, embeddings and segmentation. A particular computer vision task may also be selected for the training. For example, the computer vision task chosen may be object detection, such as flower type detection or any other object detection. In some examples, color samples may be removed first to construct a Bayer pattern image. The Bayer image may then be corrupted by injecting additive Gaussian noise with standard deviation of 25 (for 8-bit images having values from 0 to 255).

In one example, after the image degradation to model the noisy raw sensor data, the recognition performance dropped from 92% to 59%. The deep learning ISP was then trained, keeping the computer vision network fixed. Using only the regular loss function generated by the loss function generator 112, the training procedure converged slowly. An intermediate loss and total loss was then introduced via the intermediate loss function generator 114 and the total loss function generator 116 as described above with $w_{cv}=0.01$, $w_{intermediate}=0.99$ until 500 epochs, $w_{cv}=0.1$, $w_{intermediate}=0.9$ until 1000 epochs, $w_{cv}=0.5$, $w_{intermediate}=0.5$ until 2000 epochs, and finally $w_{cv}=1$, $w_{intermediate}=0$ until the end of the training. For the intermediate loss $Loss_{intermediate}$, the mean of squared distances for the first convolution layer of the MobileNet was used. With the intermediate loss included, the convergence during training was significantly faster. With the proposed combined loss, the ISP was first tuned to produce reasonably good images and then the training was further focused on producing the images that were more finely tuned for the computer vision task.

The diagram of FIG. 2 is not intended to indicate that the example system 200 is to include all of the components shown in FIG. 2. Rather, the example system 200 can be implemented using fewer or additional components not illustrated in FIG. 2 (e.g., additional datasets, ISPs, vision networks, loss function generators, loss functions, etc.).

Figure 3:
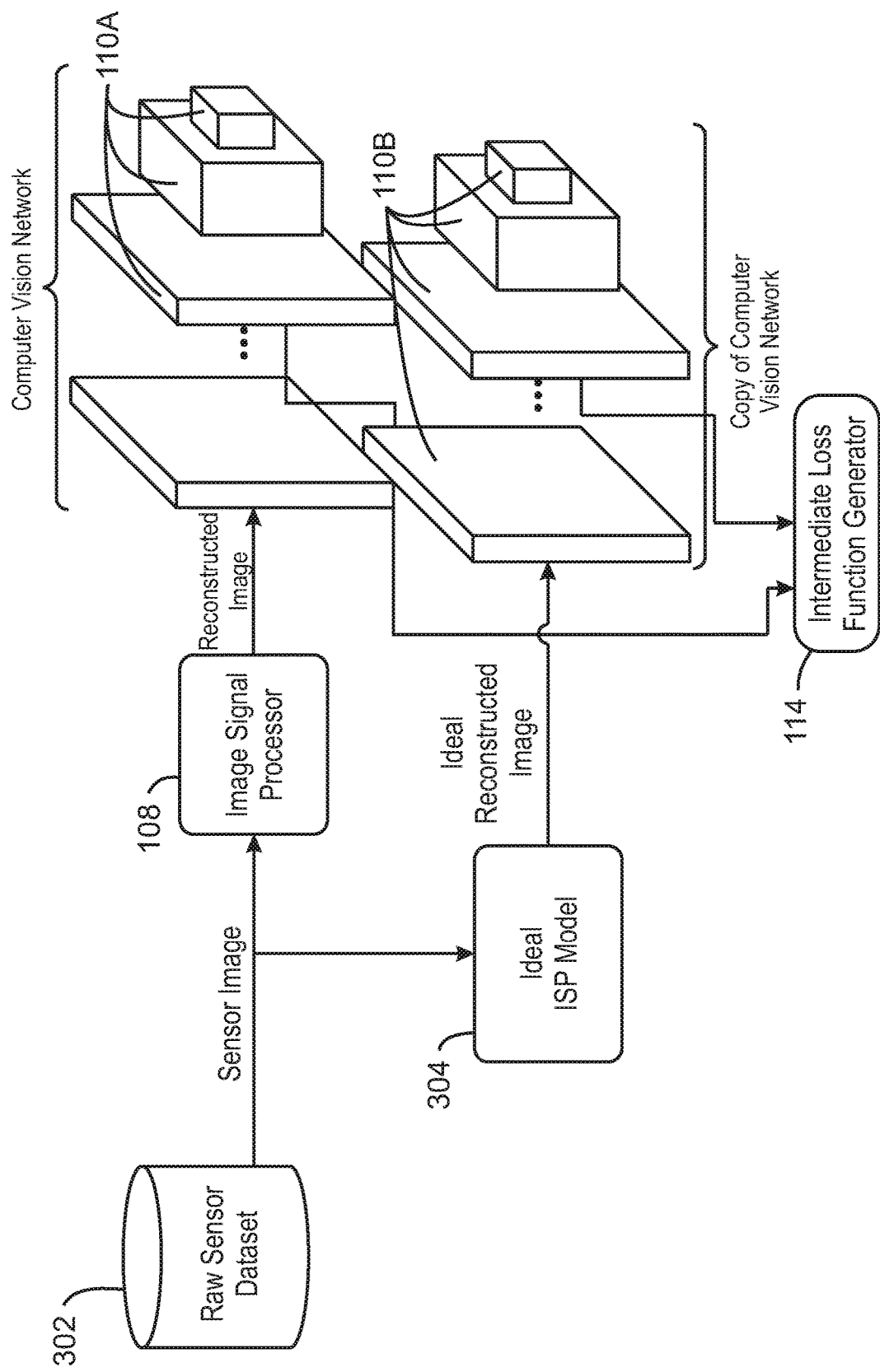
FIG. 3 is a schematic diagram illustrating an example system for training an ISP using an intermediate loss function.

FIG. 3 is a diagram illustrating an example system for training an ISP using an intermediate loss function. The example system 300 can be implemented in the computing device 500 below. For example, the image signal processor 108 can be trained using the ISP trainer of the computing device 600 of FIG. 6 or the computer readable media 700 of FIG. 7 below.

FIG. 3 includes similarly numbered elements from FIG. 1 above. In addition, FIG. 3 includes a raw sensor dataset 302. For example, the raw sensor dataset 302 may include images from an imaging device. The raw sensor dataset 302 is communicatively coupled to the ISP 108 and an ideal ISP model 304. For example, the ideal ISP model 304 may be a software model of an ideal ISP that generates ideal reconstructed images. Ideal, as used herein, is used to mean that the model may be too expensive to be implemented in silicon due to area cost, data traversal and processing speed, etc. In some examples, the ideal model may be either conventional or based on deep learning techniques.

In the example system 300 of FIG. 3, sensor images from the raw sensor dataset 302 may be sent to both the ISP 108 and the ideal ISP model 304. The ISP 108 may send a reconstructed image to be processed at the computer vision network 110A. The ideal ISP model 304 may send an ideal reconstructed image to be processed at the copy of the vision network 110B. As described above, an intermediate loss function may be generated by the intermediate loss function generator 114 based on a comparison of one or more layer outputs of the computer vision network 110A and one or more corresponding layer outputs of the copy of the computer vision network 110B. In some examples, the system 300 may be used to approximate a complex ISP represented by the ideal ISP model 304 with a simpler ISP represented by the ISP 108. For example, one or more parameters of the ISP 108 may be adapted during training based on the generated intermediate loss function or the total loss function.

The diagram of FIG. 3 is not intended to indicate that the example system 300 is to include all of the components shown in FIG. 3. Rather, the example system 300 can be implemented using fewer or additional components not illustrated in FIG. 3 (e.g., additional datasets, ISPs, vision networks, loss function generators, loss functions, etc.).

Figure 4:
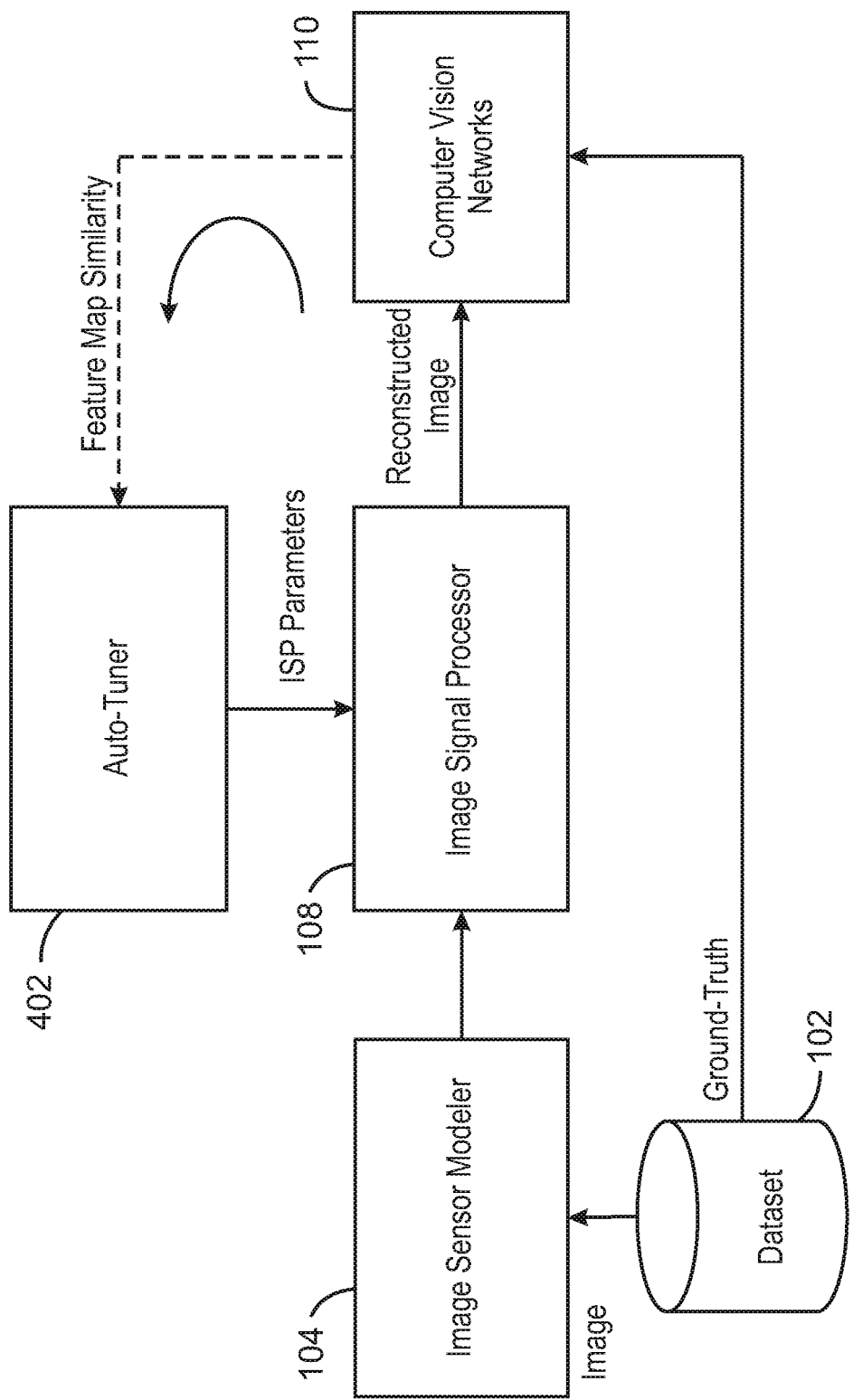
FIG. 4 is a schematic diagram illustrating an example system for auto-tuning an ISP based on feature map similarity.

FIG. 4 is a diagram illustrating an example system for auto-tuning an ISP based on feature map similarity. The example system 400 can be implemented in the computing device 500 below. For example, the image signal processor 108 can be trained using the ISP trainer of the computing device 600 of FIG. 6 or the computer readable media 700 of FIG. 7 below.

FIG. 4 includes similarly numbered elements from FIG. 1 above. In addition, the system 400 includes an auto-tuner 402 to receive feature map similarities from the computer vision networks and auto-tune the image signal processor 108. For example, the feature map similarities may have been detected using a simple difference of concatenated feature maps. In some examples, for certain CV tasks, the feature maps can be aggregated by averaging each set of feature maps $(F1+F2+ \ldots +FN)/N$, and then finding a difference between aggregated feature maps. The auto-tuner 402 can modify one or more ISP parameters of the image signal processor 108 using an evolutionary training procedure. For example, the parameters may include denoising, sharpening, demosaicing, and tone mapping parameters. Denoising may be used to reduce noise in images while preserving features used for computer vision tasks. Sharpening may be used to highlight edges and fine details in images. Demosaicing, as used herein, refers to a digital image process used to reconstruct a full color image from incomplete color samples output from an image sensor overlaid with a color filter array (CFA). Demosaicing may also be known as CFA interpolation or color reconstruction. Tone mapping may be used to map one set of colors to another to approximate an appearance of high-dynamic-range images in a medium that has a more limited dynamic range. In some examples, one or more of these parameters may be tuned to generate images that may result in improved computer vision network performance. Even though they may be visually less compelling, images generated by the auto-tuned image signal processor for high-level vision task may demonstrate better performance in terms of median average precision for object detection. For example, images generated by the auto-tuned image signal processor may contain more visible artifacts or more noise residuals, but may generate significantly better results when processed at a computer visual network.

The auto-tuner 402 may start by taking a sample or several samples from a training dataset for the high-level vision task. The image may be corrupted to mimic the raw sensor's outputs similarly as described above, and fed into the auto-tuning loop based on the evolutionary strategies. The auto-tuner 402 may then attempt to maximize the similarity or minimize the loss between feature map obtained from an ISP reconstructed image and the feature maps obtained from the ground-truth image. In some examples, after convergence finishes, a validation dataset may be used to confirm that the high-level vision tasks has better performance compared to the case when ISP is tuned by using the image quality metrics only.

An alternative to using a small set of feature maps for auto-tuning is usage of the final loss function of the high-level vision task. However, in order to reliably compute the loss, the whole validation dataset would have to be processed for each of the parameter mutations. Thus, auto-tuning based on feature map similarities may be sufficiently more efficient.

The diagram of FIG. 4 is not intended to indicate that the example system 400 is to include all of the components shown in FIG. 4. Rather, the example system 400 can be implemented using fewer or additional components not illustrated in FIG. 4 (e.g., additional datasets, ISPs, vision networks, loss function generators, loss functions, etc.).

Figure 5:
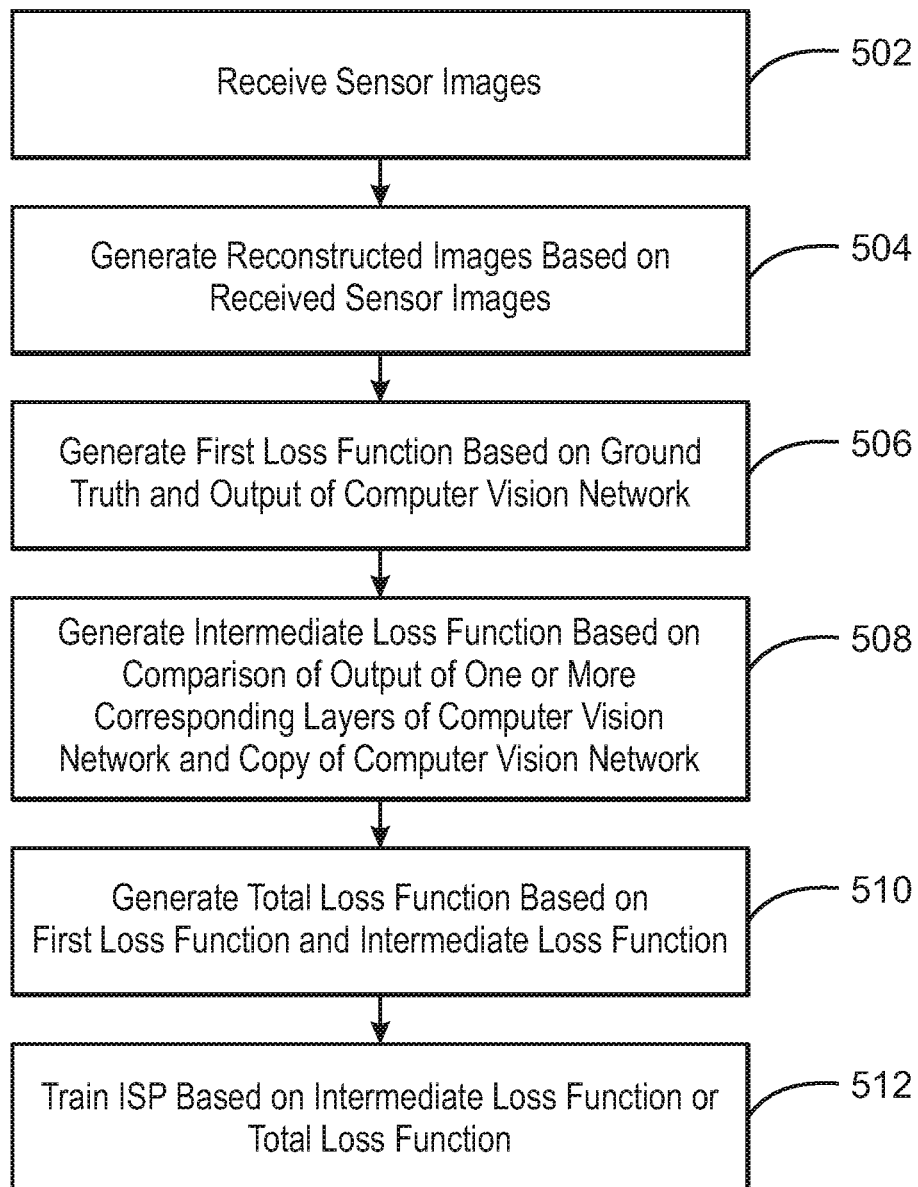
FIG. 5 is a flow chart illustrating a method for training ISPs using an intermediate loss function.

FIG. 5 is a flow chart illustrating a method for training ISPs using an intermediate loss function. The example method is generally referred to by the reference number 500 and can be implemented in the system 100-400 of FIGS. 1-4 above, the processor 602 of the computing device 600 of FIG. 6 below, or the computer readable media 700 of FIG. 7 below.

At block 502, a processor may receive sensor images. For example, the sensor images may be received from a raw sensor dataset. In some examples, the sensor images may be generated based on images received from a dataset. For example, one or more filters or other processing may be performed on the images to generate the sensor images.

At block 504, an image signal processor generates a reconstructed image based on a sensor image. For example, the reconstructed image may be the result of denoising, sharpening, demosaicing, tone mapping, or other processing performed on the sensor image.

At block 506, the processor generates a first loss function based on a ground truth and output of a computer vision network. For example, the ground truth may be received from a dataset. The output of the copy of the computer vision network may be based on an image corresponding to the sensor image.

At block 508, the processor generates an intermediate loss function based on a comparison of an output of one or more corresponding layers of the computer vision network and a copy of the computer vision network. The output of the computer vision network may be based on the reconstructed image. The output of the copy of the computer vision network may be based on an image corresponding to the sensor image. In some examples, the comparison may be any function that describes similarity. In some examples, the comparison may be performed via a deep learning network trained on a number of computer vision tasks. In some examples, an ideal image signal processor model may be used by the processor to generate an ideal reconstructed image based on the sensor image. The output of the copy of the computer vision network may be alternatively based on the ideal reconstructed image.

At block 510, the processor generates a total loss function based on the first loss function and the intermediate loss function. For example, the total loss function may be a weighted sum of the first loss function and the intermediate loss function.

At block 512, the processor trains the image signal processor based on the intermediate loss function or the total loss function. For example, in the case of differentiable ISPs, the one or more of the loss functions may be used to calculate gradients and gradients may be propagated through the layers of the image signal processor. In some examples, the processor may use weighting factors to train the image signal processor. For example, the processor may reduce a weighting factor of the intermediate loss function based on a predetermined number of iterations. The processor may thus modify one or more parameters of the image signal processor. In some examples, the processor may auto-tune one or more ISP parameters based on a feature map similarity, as described in FIG. 4 above. In some examples, the processor may also train the computer vision network and the copy of the computer vision network. For example, one or more parameters may be similarly modified in both the computer vision network and the copy of the computer vision network. Using the intermediate loss function may enable the output of the computer vision network to converge with the output of the copy of the computer vision network in less time.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

Figure 6:
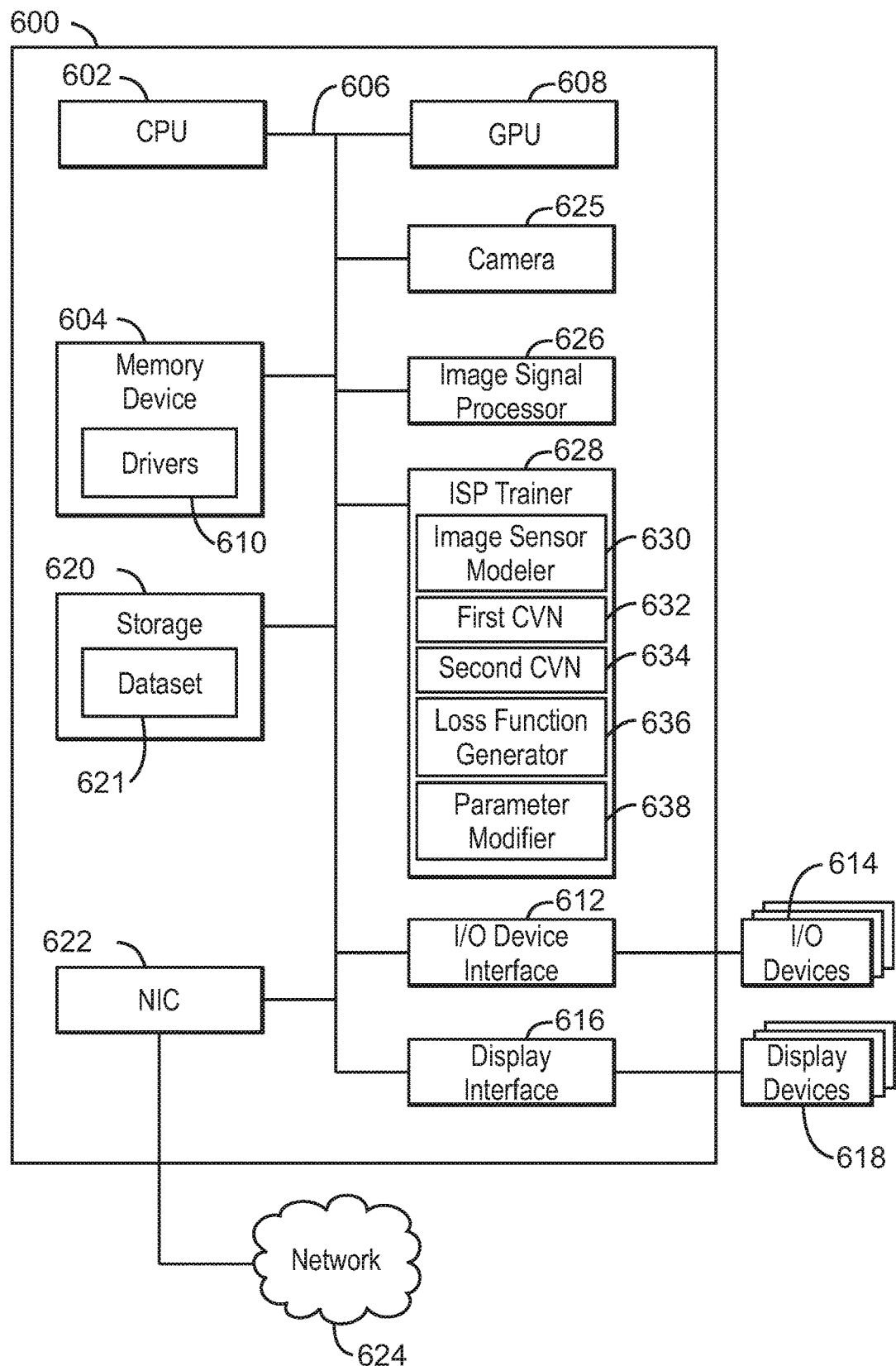
FIG. 6 is block diagram illustrating an example computing device that can train ISPs using intermediate loss functions.

Referring now to FIG. 6, a block diagram is shown illustrating an example computing device that can train ISPs using intermediate loss functions. The computing device 600 may be, for example, a laptop computer, desktop computer, tablet computer, mobile device, or wearable device, among others. In some examples, the computing device 600 may be a security camera or robotic device. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating training ISPs using intermediate loss functions. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives. The storage device 621 may include a dataset 621. For example, the dataset 621 may include images to be used for training an image signal processor. In some examples, the dataset 621 may be a raw sensor dataset including sensor images.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera 625. For example, the camera 625 may include one or more sensors. In some examples, the camera 625 may generate sensor images to be used for training an image signal processor. The sensor images may be stored in the dataset 621.

The computing device 600 also includes an image signal processor 626. The image signal processor 626 may process images for computer vision tasks. For example, images from the camera 625 may be processed by the image signal processor 626 and sent to a classifier for object detection. For example, the classifier may be a computer vision network. In some examples, the image signal processor 626 may be a deep learning image signal processor network. The image signal processor 626 may be trained using the techniques described herein. During training, the image signal processor 626 may generate reconstructed images from sensor images and send the reconstructed images to a computer vision network as described below.

The computing device 600 further includes an image signal processor (ISP) trainer 628. For example, the ISP trainer 628 can be used to modify one or more parameters of the image signal processor 626. The ISP trainer 628 can include an image sensor modeler 630, a first computer vision network (CVN) 632, a second CVN 634, a loss function generator 636, and a parameter modifier 638. In some examples, each of the components 630-638 of the ISP trainer 628 may be a microcontroller, embedded processor, or software module. The image sensor modeler 630 can generate a sensor image based on an image received from a dataset. In some examples, sensor images may be received from a raw sensor dataset. The first CVN 632 can process a reconstructed image from an image signal processor to generate output. The second CVN 634 can process an image corresponding to the sensor image and the reconstructed image to generate output. Alternatively, the output of the second CVN 634 may be based on an ideal reconstructed image generated by processing the sensor image via an ideal image signal processor model (not shown). For example, the second CVN 634 may be a copy of the first CVN 632 that processes different input. In some examples, the first CVN 632 and the second CVN 634 may be trained classifiers. The loss function generator 636 can generate a first loss function based on the output of the first CVN 634 and a ground truth received from a dataset. The loss function generator 636 can generate an intermediate loss function based on a comparison of output of one or more corresponding layers of the computer vision network and a copy of the computer vision network. For example, a simple difference may be used to generate the intermediate loss function. In some examples, an aggregation and then difference between feature maps may also be used to generate the intermediate loss function. The output of the second CVN 634 may be based on the image corresponding to the sensor image. In some examples, the comparison may be performed by a deep learning network trained on a number of computer vision tasks. The loss function generator 636 can then generate a total loss function based on the first loss function and the intermediate loss function. For example, the total loss function may be a weighted sum of the first loss function and the intermediate loss function. The parameter modifier 638 can modify one or more parameters of the image signal processor based on the intermediate loss function or the total loss function. In some examples, the parameter modifier may also modify one or more parameters of the computer vision network and the copy of the computer vision network.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the image sensor modeler 630, the first CVN 632, the second CVN 634, the loss function generator 636, the parameter modifier 638, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the ISP trainer 628 may be implemented with an application specific integrated circuit, in logic implemented in a processor, in logic implemented in a specialized graphics processing unit such as the GPU 608, or in any other device.

Figure 7:
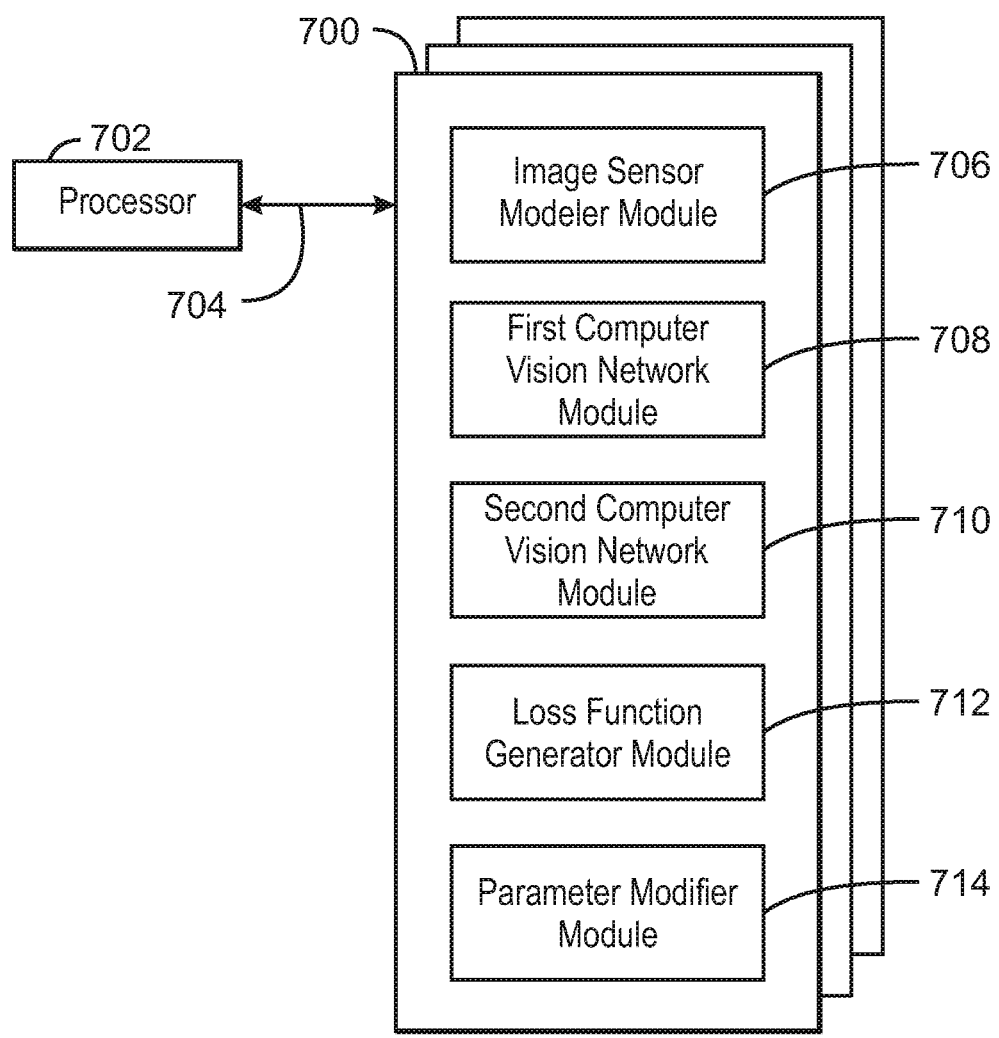
FIG. 7 is a block diagram showing computer readable media that store code for training ISPs using intermediate loss functions.

FIG. 7 is a block diagram showing computer readable media 700 that store code for training ISPs using intermediate loss functions. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an image sensor modeler module 706 may be configured to generate a sensor image based on an image received from a dataset. A first computer vision network module 708 may be configured to process a reconstructed image from an image signal processor to generate output. A second computer vision network module 710 may be configured to process an image corresponding to the sensor image and the reconstructed image to generate output. The second computer vision network may be a copy of the first computer vision network. Alternatively, the output of the second computer vision network module 710 may be based on an ideal reconstructed image generated by processing the sensor image via an ideal image signal processor model. A loss function generator module 712 may be configured to generate an intermediate loss function based on a comparison of an output of one or more corresponding layers of the first computer vision network and the second computer vision network. In some examples, the loss function generator module 712 may be configured to generate a total loss function. For example, the loss function generator module 712 may be configured to generate a first loss function based on a ground truth and the output of the computer vision network. The loss function generator module 712 may be configured to generate the total loss function based on the first loss function and the intermediate loss function. A parameter modifier module 714 may be configured to train an image signal processor based on the intermediate loss function or the total loss function. For example, the parameter modifier module 714 may be configured to modify one or more parameters of the image signal processor based on the intermediate loss function or the total loss function. In some examples, the parameter modifier module 714 may be configured to auto-tune one or more ISP parameters based on a feature map similarity. In some examples, the parameter modifier module 714 may also be configured to modify one or more parameters of the computer vision network and the copy of the computer vision network.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for training image signal processors. The apparatus includes an image signal processor to be trained, the image signal processor to generate a reconstructed image based on a sensor image. The apparatus also includes an intermediate loss function generator to generate an intermediate loss function based on a comparison of output of one or more corresponding layers of a computer vision network and a copy of the computer vision network. The apparatus further includes a parameter modifier to modify one or more parameters of the image signal processor based on the intermediate loss function.

Example 2 includes the apparatus of example 1, including or excluding optional features. In this example, the sensor image is received from a raw sensor dataset.

Example 3 includes the apparatus of any one of examples 1 to 2, including or excluding optional features. In this example, the apparatus includes an image sensor modeler to generate the sensor image based on the image, wherein the image is received from a dataset.

Example 4 includes the apparatus of any one of examples 1 to 3, including or excluding optional features. In this example, the image signal processor comprises a deep learning image signal processor network.

Example 5 includes the apparatus of any one of examples 1 to 4, including or excluding optional features. In this example, the output of the copy of the computer vision network is based on the image corresponding to the sensor image.

Example 6 includes the apparatus of any one of examples 1 to 5, including or excluding optional features. In this example, the computer vision network and the copy of the computer vision network comprise trained classifiers.

Example 7 includes the apparatus of any one of examples 1 to 6, including or excluding optional features. In this example, the computer vision network is to process the reconstructed image to generate output and the copy of the computer vision network to process an image of the images corresponding to the reconstructed image to generate output.

Example 8 includes the apparatus of any one of examples 1 to 7, including or excluding optional features. In this example, the parameter modifier is to also modify one or more parameters of the computer vision network and the copy of the computer vision network.

Example 9 includes the apparatus of any one of examples 1 to 8, including or excluding optional features. In this example, the comparison is to be performed by a deep learning network trained on a number of computer vision tasks.

Example 10 includes the apparatus of any one of examples 1 to 9, including or excluding optional features. In this example, the output of the copy of the computer vision network is based on an ideal reconstructed image generated by processing the sensor image via an ideal image signal processor model.

Example 11 is a method for training image signal processors. The method includes generating, via an image signal processor, a reconstructed image based on a sensor image. The method also includes generating, via the processor, an intermediate loss function based on a comparison of an output of one or more corresponding layers of a computer vision network and a copy of the computer vision network. The output of the computer vision network is based on the reconstructed image. The method further includes training, via the processor, an image signal processor based on the intermediate loss function.

Example 12 includes the method of example 11, including or excluding optional features. In this example, the method includes generating, via the processor, the sensor image based on an image received from a dataset.

Example 13 includes the method of any one of examples 11 to 12, including or excluding optional features. In this example, the method includes generating, via the processor, a first loss function based on a ground truth and the output of the computer vision network; generating, via the processor, a total loss function based on the first loss function and the intermediate loss function; and training, via the processor, the image signal processor based on the total loss function.

Example 14 includes the method of any one of examples 11 to 13, including or excluding optional features. In this example, the output of the copy of the computer vision network is based on an image corresponding to the sensor image.

Example 15 includes the method of any one of examples 11 to 14, including or excluding optional features. In this example, training the image signal processor comprises reducing a weighting factor of the intermediate loss function based on a predetermined number of iterations.

Example 16 includes the method of any one of examples 11 to 15, including or excluding optional features. In this example, training the image signal processor comprises modifying one or more parameters of the image signal processor.

Example 17 includes the method of any one of examples 11 to 16, including or excluding optional features. In this example, training the image signal processor comprises auto-tuning one or more ISP parameters based on a feature map similarity.

Example 18 includes the method of any one of examples 11 to 17, including or excluding optional features. In this example, the method includes training the computer vision network and the copy of the computer vision network.

Example 19 includes the method of any one of examples 11 to 18, including or excluding optional features. In this example, the method includes performing the comparison via a deep learning network trained on a number of computer vision tasks.

Example 20 includes the method of any one of examples 11 to 19, including or excluding optional features. In this example, the method includes generating, via an ideal image signal processor model, an ideal reconstructed image based on the sensor image, wherein the output of the copy of the computer vision network is based on the ideal reconstructed image.

Example 21 is at least one computer readable medium for training image signal processors having instructions stored therein that direct the processor to generate a reconstructed image based on a sensor image. The computer-readable medium also includes instructions that direct the processor to generate an intermediate loss function based on a comparison of an output of one or more corresponding layers of a computer vision network and a copy of the computer vision network. The output of the computer vision network is based on the reconstructed image. The computer-readable medium further includes instructions that direct the processor to train an image signal processor based on the intermediate loss function.

Example 22 includes the computer-readable medium of example 21, including or excluding optional features. In this example, the computer-readable medium includes instructions to generate the sensor image based on an image received from a dataset.

Example 23 includes the computer-readable medium of any one of examples 21 to 22, including or excluding optional features. In this example, the computer-readable medium includes instructions to: generate a first loss function based on a ground truth and the output of the computer vision network; generate a total loss function based on the first loss function and the intermediate loss function; and train the image signal processor based on the total loss function.

Example 24 includes the computer-readable medium of any one of examples 21 to 23, including or excluding optional features. In this example, the computer-readable medium includes instructions to modify one or more parameters of the computer vision network and the copy of the computer vision network.

Example 25 includes the computer-readable medium of any one of examples 21 to 24, including or excluding optional features. In this example, the computer-readable medium includes instructions to auto-tune one or more ISP parameters based on a feature map similarity.

Example 26 includes the computer-readable medium of any one of examples 21 to 25, including or excluding optional features. In this example, the computer-readable medium includes instructions to modify one or more parameters of the image signal processor.

Example 27 includes the computer-readable medium of any one of examples 21 to 26, including or excluding optional features. In this example, the computer-readable medium includes instructions to reduce a weighting factor of the intermediate loss function based on a predetermined number of iterations.

Example 28 includes the computer-readable medium of any one of examples 21 to 27, including or excluding optional features. In this example, the output of the copy of the computer vision network is based on an image corresponding to the sensor image.

Example 29 includes the computer-readable medium of any one of examples 21 to 28, including or excluding optional features. In this example, the computer-readable medium includes instructions to train the computer vision network and the copy of the computer vision network.

Example 30 includes the computer-readable medium of any one of examples 21 to 29, including or excluding optional features. In this example, the computer-readable medium includes instructions to perform the comparison via a deep learning network trained on a number of computer vision tasks.

Example 31 is a system for training image signal processors. The system includes an image signal processor to be trained. The image signal processor is to generate a reconstructed image based on a sensor image. The system also includes an intermediate loss function generator to generate an intermediate loss function based on a comparison of output of one or more corresponding layers of a computer vision network and a copy of the computer vision network. The system further includes and a parameter modifier to modify one or more parameters of the image signal processor based on the intermediate loss function.

Example 32 includes the system of example 31, including or excluding optional features. In this example, the sensor image is received from a raw sensor dataset.

Example 33 includes the system of any one of examples 31 to 32, including or excluding optional features. In this example, the system includes an image sensor modeler to generate the sensor image based on the image, wherein the image is received from a dataset.

Example 34 includes the system of any one of examples 31 to 33, including or excluding optional features. In this example, the image signal processor comprises a deep learning image signal processor network.

Example 35 includes the system of any one of examples 31 to 34, including or excluding optional features. In this example, the output of the copy of the computer vision network is based on the image corresponding to the sensor image.

Example 36 includes the system of any one of examples 31 to 35, including or excluding optional features. In this example, the computer vision network and the copy of the computer vision network comprise trained classifiers.

Example 37 includes the system of any one of examples 31 to 36, including or excluding optional features. In this example, the computer vision network is to process the reconstructed image to generate output and the copy of the computer vision network to process an image of the images corresponding to the reconstructed image to generate output.

Example 38 includes the system of any one of examples 31 to 37, including or excluding optional features. In this example, the parameter modifier is to also modify one or more parameters of the computer vision network and the copy of the computer vision network.

Example 39 includes the system of any one of examples 31 to 38, including or excluding optional features. In this example, the comparison is to be performed by a deep learning network trained on a number of computer vision tasks.

Example 40 includes the system of any one of examples 31 to 39, including or excluding optional features. In this example, the output of the copy of the computer vision network is based on an ideal reconstructed image generated by processing the sensor image via an ideal image signal processor model.

Example 41 is a system for training image signal processors. The system includes means for generating a reconstructed image based on a sensor image. The system also includes means for generating an intermediate loss function based on a comparison of output of one or more corresponding layers of a computer vision network and a copy of the computer vision network. The system further includes means for modifying one or more parameters of the image signal processor based on the intermediate loss function.

Example 42 includes the system of example 41, including or excluding optional features. In this example, the sensor image is received from a raw sensor dataset.

Example 43 includes the system of any one of examples 41 to 42, including or excluding optional features. In this example, the system includes means for generating the sensor image based on the image, wherein the image is received from a dataset.

Example 44 includes the system of any one of examples 41 to 43, including or excluding optional features. In this example, the means for generating the reconstructed image comprises a deep learning image signal processor network.

Example 45 includes the system of any one of examples 41 to 44, including or excluding optional features. In this example, the output of the copy of the computer vision network is based on the image corresponding to the sensor image.

Example 46 includes the system of any one of examples 41 to 45, including or excluding optional features. In this example, the computer vision network and the copy of the computer vision network comprise trained classifiers.

Example 47 includes the system of any one of examples 41 to 46, including or excluding optional features. In this example, the computer vision network is to process the reconstructed image to generate output and the copy of the computer vision network to process an image of the images corresponding to the reconstructed image to generate output.

Example 48 includes the system of any one of examples 41 to 47, including or excluding optional features. In this example, the means for modifying the one or more parameters is to also modify one or more parameters of the computer vision network and the copy of the computer vision network.

Example 49 includes the system of any one of examples 41 to 48, including or excluding optional features. In this example, the comparison is to be performed by a deep learning network trained on a number of computer vision tasks.

Example 50 includes the system of any one of examples 41 to 49, including or excluding optional features. In this example, the output of the copy of the computer vision network is based on an ideal reconstructed image generated by processing the sensor image via an ideal image signal processor model.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for training image signal processors, comprising:
    an image signal processor to be trained, the image signal processor to generate a reconstructed image based on a sensor image;
    an intermediate loss function generator to generate an intermediate loss function based on a comparison of intermediate outputs of one or more corresponding intermediate layers of a computer vision network and a copy of the computer vision network, wherein the computer vision network generates an intermediate output based on the reconstructed image and the copy of the computer vision network generates an intermediate output at a corresponding intermediate layer based on an image from a dataset used to generate the sensor image; and
    a parameter modifier to modify one or more parameters of the image signal processor based on the intermediate loss function.

2. The apparatus of claim 1, wherein the sensor image is received from a raw sensor dataset.

3. The apparatus of claim 1, comprising an image sensor modeler to generate the sensor image based on the image from the dataset.

4. The apparatus of claim 1, wherein the image signal processor comprises a deep learning image signal processor network.

5. The apparatus of claim 1, wherein the computer vision network and the copy of the computer vision network comprise trained classifiers.

6. The apparatus of claim 1, wherein the parameter modifier is to also modify one or more parameters of the computer vision network and the copy of the computer vision network.

7. The apparatus of claim 1, wherein the comparison is to be performed by a deep learning network trained on a number of computer vision tasks.

8. The apparatus of claim 1, wherein the intermediate output of the copy of the computer vision network is based on an ideal reconstructed image generated by processing the sensor image via an ideal image signal processor model.

9. The apparatus of claim 1, comprising:
a loss function generator to generate a first loss function based on a ground truth and a final output of the computer vision network; and
a total loss function generator to generate a total loss function based on the first loss function and the intermediate loss function.

10. The apparatus of claim 9, wherein the total loss function is based on a weighted combination of the first loss function and the intermediate loss function.

11. The apparatus of claim 10, wherein the intermediate loss function is weighted higher in earlier iterations of training.

12. A method for training image signal processors, comprising:
generating, via an image signal processor, a reconstructed image based on a sensor image;
generating, via a processor, an intermediate loss function based on a comparison of intermediate outputs of one or more corresponding intermediate layers of a computer vision network and a copy of the computer vision network, wherein the output of the computer vision network is based on the reconstructed image, wherein the computer vision network generates an intermediate output based on the reconstructed image and the copy of the computer vision network generates an intermediate output at a corresponding intermediate layer based on an image from a dataset used to generate the sensor image; and
training, via the processor, an image signal processor based on the intermediate loss function.

13. The method of claim 12, comprising generating, via the processor, the sensor image based on the image received from the dataset.

14. The method of claim 12, comprising:
generating, via the processor, a first loss function based on a ground truth and a final output of the computer vision network;
generating, via the processor, a total loss function based on the first loss function and the intermediate loss function; and
training, via the processor, the image signal processor based on the total loss function.

15. The method of claim 12, wherein training the image signal processor comprises reducing a weighting factor of the intermediate loss function based on a predetermined number of iterations.

16. The method of claim 12, wherein training the image signal processor comprises modifying one or more parameters of the image signal processor.

17. The method of claim 12, wherein training the image signal processor comprises auto-tuning one or more ISP parameters based on a feature map similarity.

18. The method of claim 12, comprising training the computer vision network and the copy of the computer vision network.

19. The method of claim 12, comprising performing the comparison via a deep learning network trained on a number of computer vision tasks.

20. The method of claim 12, comprising generating, via an ideal image signal processor model, an ideal reconstructed image based on the sensor image, wherein the output of the copy of the computer vision network is based on the ideal reconstructed image.

21. At least one non-transitory computer readable medium for training image signal processors having instructions stored therein that, in response to being executed on a computing device, cause the computing device to:
generate a reconstructed image based on a sensor image;
generate an intermediate loss function based on a comparison of intermediate outputs of one or more corresponding intermediate layers of a computer vision network and a copy of the computer vision network, wherein the output of the computer vision network is based on the reconstructed image, wherein the computer vision network generates an intermediate output based on the reconstructed image and the copy of the computer vision network generates an intermediate output at a corresponding intermediate layer based on an image from a dataset used to generate the sensor image; and
train an image signal processor based on the intermediate loss function.

22. The at least one non-transitory computer readable medium of claim 21, comprising instructions to generate the sensor image based on the image received from the dataset.

23. The at least one non-transitory computer readable medium of claim 21, comprising instructions to:
generate a first loss function based on a ground truth and a final output of the computer vision network;
generate a total loss function based on the first loss function and the intermediate loss function; and
train the image signal processor based on the total loss function.

24. The at least one non-transitory computer readable medium of claim 21, comprising instructions to modify one or more parameters of the computer vision network and the copy of the computer vision network.

25. The at least one non-transitory computer readable medium of claim 21, comprising instructions to auto-tune one or more ISP parameters based on a feature map similarity.

* * * * *